United States Patent [19]

Kuzma

[11] Patent Number: 5,416,520
[45] Date of Patent: May 16, 1995

[54] MULTIPLE ENCODER OUTPUT BUFFER APPARATUS FOR DIFFERENTIAL CODING OF VIDEO INFORMATION

[75] Inventor: Andrew J. Kuzma, Portland, Oreg.

[73] Assignee: Intel Corporation, Santa Clara, Calif.

[21] Appl. No.: 159,665

[22] Filed: Nov. 30, 1993

[51] Int. Cl.⁶ ............................................... H04N 7/12
[52] U.S. Cl. ..................................... 348/409; 348/384
[58] Field of Search ............... 348/384, 400, 401, 409, 348/412, 423, 419; H04N 7/12

[56] References Cited

U.S. PATENT DOCUMENTS

| | | | |
|---|---|---|---|
| 5,121,202 | 6/1992 | Tanoi | 348/384 |
| 5,140,417 | 8/1992 | Tanaka et al. | 348/384 |
| 5,196,933 | 3/1993 | Henot | 348/419 |
| 5,227,875 | 7/1993 | Suu et al. | 348/384 |

Primary Examiner—Howard W. Britton
Assistant Examiner—Richard Lee

Attorney, Agent, or Firm—Blakely, Sokoloff, Taylor & Zafman

[57] ABSTRACT

Feedback is introduced between a video CODEC and the intended communications channel such that the characteristics of the channel are used to drive multiple video output buffers. These multiple output buffers share an original temporal video reference, but have different subsequent temporal video images. The communications channel interface then picks the subsequent video image buffer that best matches the current conditions experienced by it. By using a predictor of the channel performance, the video algorithm can be tuned to provide video output buffers with the best guess of how the buffers should be configured. A number of subsequent histories of an image are buffered until the receiving channel indicates it is ready to receive the next. Then the appropriate output buffer having the corresponding temporal change in the video is used to supply the next frame change information to the receiving station.

1 Claim, 5 Drawing Sheets

MULTIPLE ENCODER OUTPUT BUFFER APPARATUS FOR DIFFERENTIAL CODING OF VIDEO INFORMATION

BACKGROUND OF THE INVENTION

1. Field of the Invention

The present invention relates to the transmission of information over a communications path. More particularly, the present invention relates to the communications of high bandwidths information over networks of varying types.

2. Art Background

Until recently, telecommunications and computing were considered to be entirely separate disciplines. Telecommunications was analog and done in real time whereas computing was digital and performed at a rate determined by the processing speed of a computer. Today, such technologies as speech processing, electronic mail and facsimile have blurred these lines. In the coming years, computing and telecommunications will become almost indistinguishable in a race to support a broad range of new multimedia (i.e., voice, video and data) applications. These applications are made possible by emerging digital-processing technologies, which include: compressed audio (both high fidelity audio and speech), high resolution still images, and compressed video. The emerging technologies will allow for collaboration at a distance, including video conferencing.

Of these technologies, video is particularly exciting in terms of its potential applications. But video is also the most demanding in terms of processing power and sheer volume of data to be processed. Uncompressed digital video requires somewhere between 50 and 200 Mb/s (megabits per second) to support the real-time transmission of standard television quality images. This makes impractical the widespread use of uncompressed digital video in telecommunications applications.

Fortunately, there is considerable redundancy in video data, both in terms of information theory and human perception. This redundancy allows for the compression of digital video sequences into lower transmission rates. For some time, researchers have been aware of a variety of techniques that can be used to compress video data sequences anywhere from 2:1 to 1000:1, depending on the quality required by the application. Until recently, however, it was not practical to incorporate these techniques into low cost video-based applications.

A number of standards have been recently developed for such activities as video conferencing, the transmission and storage of standard high quality still images, as well as standards for interactive video playback to provide interoperability between numerous communications points. The standards recognize a need for quality video compression to reduce the tremendous amount of data required for the transmission of video information.

Two important methods of data compression for video information are used widely throughout the various standards for video communication. These are the concepts of frame differencing and motion compensation. Frame differencing recognizes that a normal video sequence has little variation from one frame to the next. If, instead of coding each frame, only the differences between a frame and the previous frame are coded, then the amount of information needed to describe the new frame will be dramatically reduced. Motion compensation recognizes that much of the difference that does occur between successive frames can be characterized as a simple translation of motion, caused either by the moving of objects in the scene or by a pan of the field of view. Rather than form a simple difference between blocks in a current frame and the same block in the previous frame, the area around those blocks can be searched in the previous frame to find an offset block that more closely matches the block of the current frame. Once a best match has been identified, the difference between a reference block in the current frame and the best match in the previous frame are coded to produce a vector that describes the offset of the best match. This motion vector then can be used with the previous frame to produce the equivalent of what the current frame should be. These methods, and others are incorporated into systems which make possible the rapid transmission of real-time video information.

As the worlds of telecommunications and computers blend closely together, the telecommunications aspects of communications will have to contend with some of the constraints of the computer world. Particularly, video conferencing over existing computer networks will prove a challenge in that maintaining real time information communication over traffic-burdened existing network protocols may prove insurmountable.

Current video algorithms assume a nearly constant bandwidth availability for the encoding of video information. This is evidenced by the use of only a single output buffer for traditional video encoder output. It is common to use the output buffer fullness as a feedback parameter for encoding subsequent images; i.e., with higher or lower levels of quantization. A well-known effect resulting from using a single output buffer is called "bit-bang" where the output buffer is over depleted by the interface to the communications channel, causing the feedback loop to indicate that the buffer can handle lots of data, which in turn causes the video compression algorithm to under optimize the subsequent image coding. The user perceives the bit-bang as an uneven quality and frame rate.

To alleviate bit-bang, the typical approach has been to limit the amount of data pulled out from the encoder video output buffer to a fraction of the total size of the output buffer; 10% to 30% is typical. This approach keeps the feedback indicator rather small, and encoding more uniform. The underlying assumption of this approach is that the communications channel will usually not be changing rapidly. Exceptions are caused by connectivity interruptions, such as burst errors, which are handled strictly as exceptions to the call. In a local area network (LAN), or other collision-sensing multiple access channel, or in other networks with burst characteristics (such as noisy RF channels), this underlying assumption no longer holds. Over these sorts of communications channels, unanticipated transmission delays may result in bit-bang problems which are not so readily overcome by limiting the size of the feedback buffer. Thus, video jerkiness will result in real-time video communication over such channels. It would be advantageous, and is therefore an object of the present invention to provide a video transmission mechanism which can be accommodated on such potential bursty networks.

SUMMARY OF THE INVENTION

From the foregoing, it can be appreciated that there is a need for a mechanism of incorporating real-time video data communication over traditional network protocols to smooth video transmission. It is therefore an object of the present invention to provide a method and apparatus for the conveyance of video data over such networks as local area networks.

These and other objects of the present invention are provided by introducing feedback between the video CODEC and the intended communications channel such that the characteristics of the channel are used to drive multiple video output buffers. These multiple output buffers share an original temporal video reference, but have different subsequent temporal video images. The communications channel interface then picks the subsequent video image buffer that best matches the current conditions experienced by it. By using a predictor of the channel performance, the video algorithm can be tuned to provide video output buffers with the best guess of how the buffers should be configured. A number of subsequent histories of an image are buffered until the receiving channel indicates it is ready to receive the next. Then the appropriate output buffer having the corresponding temporal change in the video is used to supply the next frame change information to the receiving station.

BRIEF DESCRIPTION OF THE DRAWINGS

The objects, features and advantages of the present invention will be apparent from the following detailed description in which.

DETAILED DESCRIPTION OF THE INVENTION

A method and apparatus are described for the conveyance of real-time isochronous data over bursty networks. Although the present invention is described predominantly in terms of the transmission of video information, the concepts and method are broad enough to encompass the transmission of real-time audio and other data requiring isochronous data transfer. Throughout this detailed description, numerous details are specified such as bit rates and frame sizes, in order to provide a thorough understanding of the present invention. To one skilled in the art, however, it will be understood that the present invention may be practiced without such specific details. In other instances, well-known control structures and gate level circuits have not been shown in detail in order not to obscure unnecessarily the present invention. Particularly, some functions are described to be carried out by various logic circuits. Those of ordinary skill in the art, having been described the various functions will be able to implement the necessary logic circuits without undue experimentation.

Figure 1:
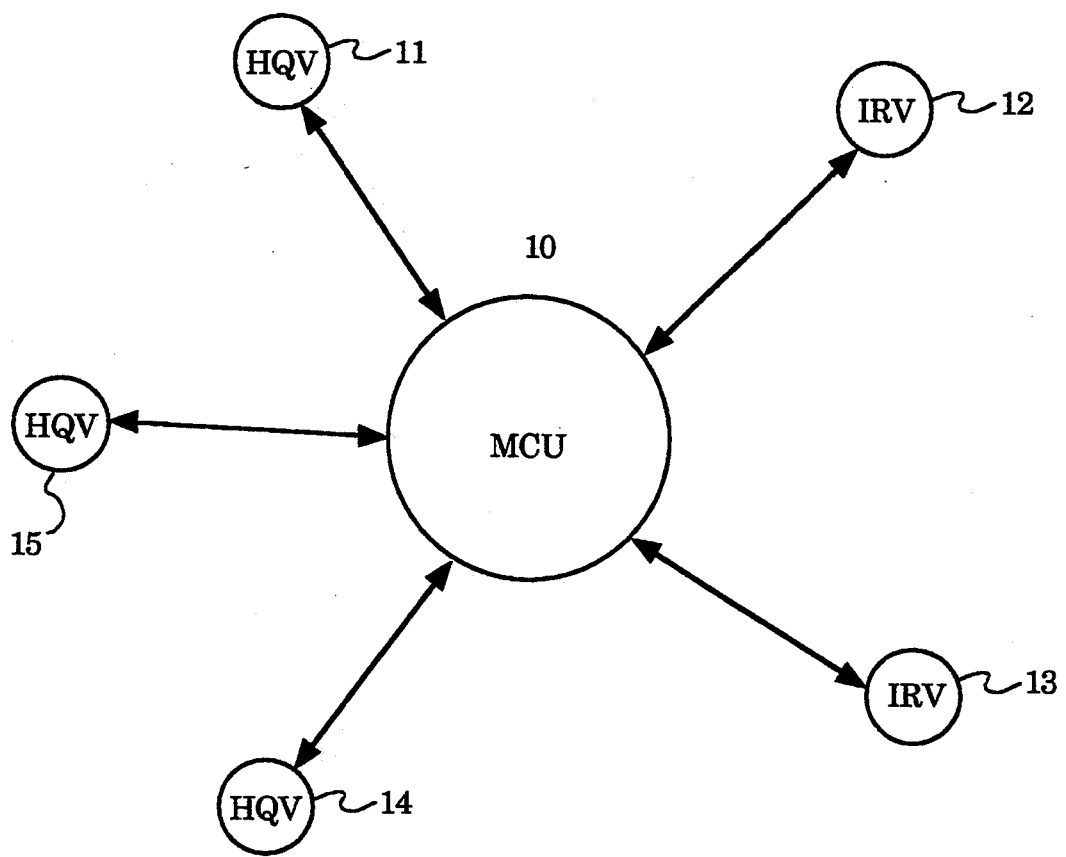
FIG. 1 demonstrate a hypothetical network having a plurality of video-capable nodes for interacting and providing video conferencing capabilities.

FIG. 1 is used to illustrate a simple network having a plurality of video-capable nodes. The network is illustrated as a simple star network 10 having a centrally incorporated multi-point control unit (MCU). The network is presented as having five (5) nodes 11, 12, 13, 14 and 15. For the purposes of explanation, these will all be considered video-capable nodes, with nodes 12 and 13 supporting IRV video (160 pixels×120 lines) while nodes 11, 14 and 15 support HQV video (320 pixels×240 lines). The network illustrated in FIG. 1 is purely for illustrative purposes and many more complex nodes may be incorporated that are non-video capable on the same network as the illustrated nodes. Further, the present invention may be applied to any network configuration besides the star configuration of FIG. 1 such as token ring networks, branching tree networks, etc. The fundamental requirement for the network which has these video-capable nodes is that the nodes be able to transmit data, including video data from one point to another and receive acknowledgments from the receiving node.

Figure 2:
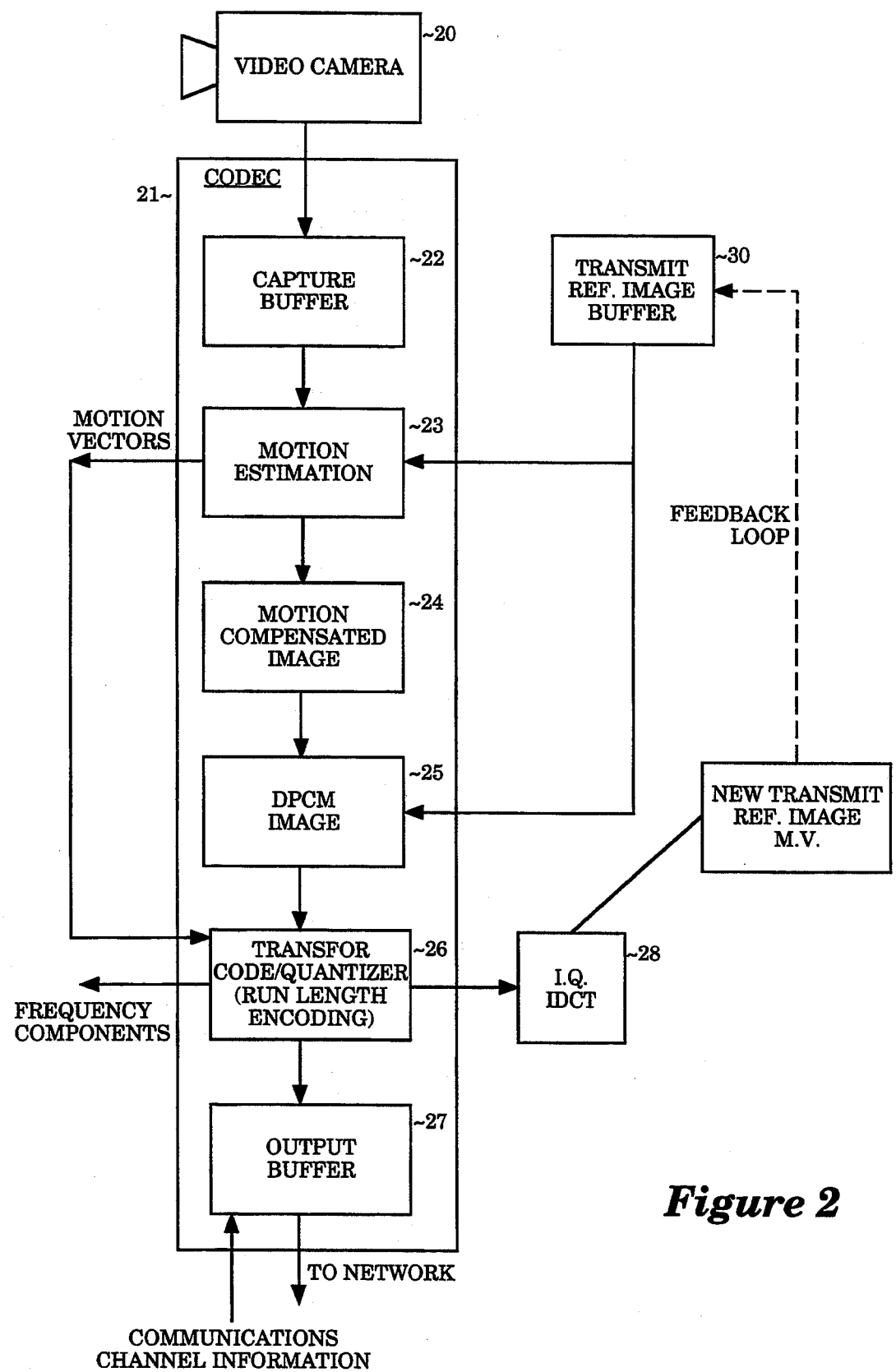
FIG. 2 illustrates hardware to be utilized in implementing the present invention in one embodiment.

FIG. 2 illustrates typical video encoding hardware to which the present invention may be applied. This can be used for preparing video data to be transmitted over a network of the type illustrated in FIG. 1 to provide real-time video conferencing. A video camera 20 receives the video image that is to be encoded and conveyed. Such cameras are common and work on a number of technologies such as charge coupled devices, etc. The video camera may directly include video CODEC 21 or it may be tightly coupled as illustrated in the figure. The video CODEC 21 receives the electronic image from the camera and digitizes the image when being used in its encoder capacity. Video CODECS are generally known and come in a number of varieties which may be used for encoding video data to be transmitted and decoding video data when received. In FIG. 2, the camera output is propagated to the capture buffer 22 of video CODEC 21.

From the capture buffer 22, the video information is processed by motion estimation circuitry 23. The motion estimation circuitry is used to generate motion vectors which describe the difference of a portion of a video image from the previously recorded image in terms of a translational offset. The motion estimation circuitry compares the currently decoded frame from the previous frame stored in the transmit reference image buffer 30 about which more will be described further herein. From the motion estimation circuitry, the outputs are the motion vectors and the motion compensated image 24. The motion compensated image 24 is then processed by the differential pulse code modulation (DPCM) circuitry 25 which generates digital information of the changes to the previously stored transmit reference image. Finally, a final stage of coding is done at transform coding block 26 which also performs quantization and run-length encoding. Run-length encoding is a technique for compressing data sequences that have large numbers of zeros and is well-known to those of ordinary skill in the art. This transform coder may perform a discrete cosine transform (DCT).

From the transform coding block, the coded sequence is propagated to the output buffer 27 which is used to maintain a constant bit rate for the output to the network. As was described, prior art methods used the output buffer fullness to regulate the degree of quantization that would be applied to the compressing and encoding circuitry because a constant bandwidth availability was assumed.

The transform coder block 26 also outputs the compressed image data to generate a new transfer reference image for storage in the transmit reference image buffer. The encoding logic provides the compressed image data to a decoding block 28 that has an inverse quantizer and inverse discrete cosine transform decoder which can be used to combine the decoded image data with the previously stored transfer reference image to yield a new transmit reference image which corresponds to the image that was most recently propagated on the network. It is this image data that would be used in calculating the changes in the image in sending the next frame of information. In other words, the transmit reference image, which is the same image that will be reconstructed at the other end by the video decoder, is used as the basis of subsequent encoding, including motion vectors and motion compensated image compression.

As was described in the previous section, the prior art feedback mechanism using the output buffer assumed a constant bit rate would be available for the transmission of information. This assumption no longer holds for video conferencing type devices which are on bursty networks such as CSMA LAN networks. The solution proposed by the present invention is to provide feedback between the video CODEC and the communications channel such that the characteristics of the channel are used to drive multiple video output buffers. These buffers share an original temporal video reference but will have different subsequent temporal video images. The communications channel interface then picks the subsequent video image buffer that best matches the current condition. By using a predictor of the channel performance, the video algorithm can be tuned to provide video output buffers with the best guess of how the buffers should be configured. Once a particular output buffer's image data is selected, the remaining buffers can be flushed to be refilled again based on a newly calculated transmit reference image. In the limit, the final action is to revert to an exception handler similar to current video CODECS, i.e., insert a key frame to restart the encoding of video data transmission.

Figure 3:
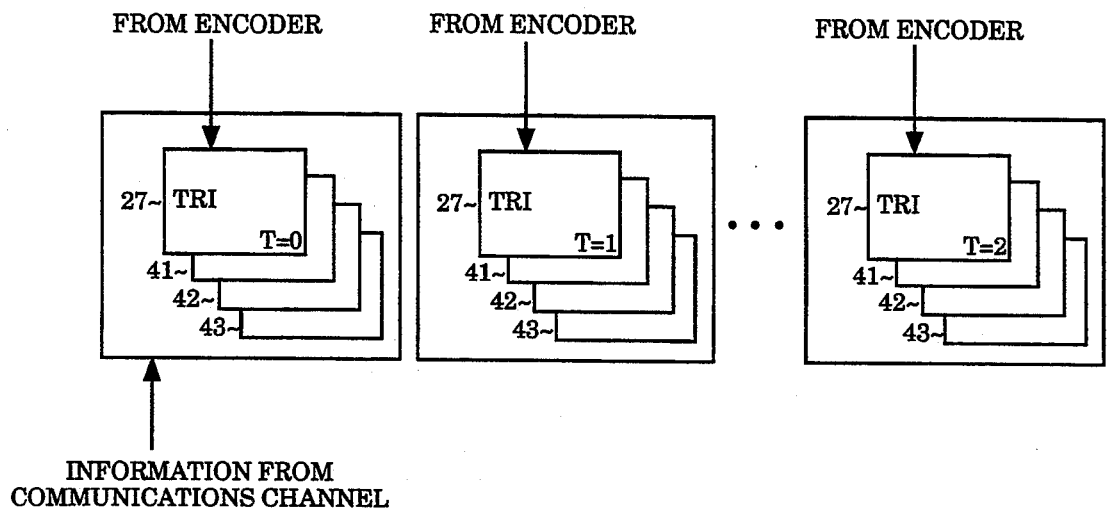
FIG. 3 illustrates a logical rendition of a plurality of output buffers with successive time interval video information for one embodiment of the present invention.

FIG. 3 illustrates conceptually the logical multiple output buffers of the present invention. When the video camera 20 records an image it is encoded by the encoding circuitry described above and the encoded information is propagated to the output buffer 27. In a bursty network, the network may not be able to receive this newly calculated image data. Accordingly, the camera continues to detect images and encode the data and newly translated data is stored in subsequent output buffers such as 41, 42 or 43. For example, the information stored in the output buffer 27 may correspond to the digital information equivalent to the changes from the transmit reference image stored in the transmit reference image buffer 30 at time t=0. In output buffer 41, the data information may correspond to the difference between the transfer reference image and 1/15th of a second later than the data information stored in buffer 27. Likewise, output buffers 42 and 43 may store data corresponding to the temporal change between the transmit reference image and the image before the camera at successively later times.

The video encoder and camera circuitry described may be incorporated as part of a station that is on the network and are responsive to information received over the communications channel. When a given node again has the bus, the output buffer with the most current image may be signaled to transmit its information to the receiving node. Likewise, the channel information is used to then calculate the next transmit reference image for storage. The output buffers are then flushed and are again loaded in a time sequential manner until the data is again ready to be sent over the network. While four (4) output buffers are illustrated, this is purely for illustrative purposes in that as many buffers may be implemented as computing power and resources provide.

Figure 4:
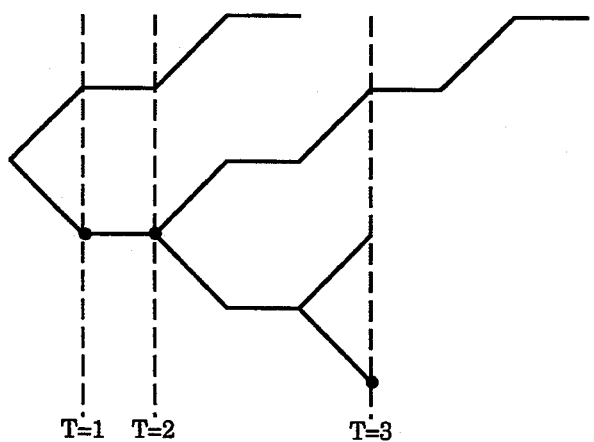
FIG. 4 illustrates a branching tree structure corresponding to successive temporal transmit reference images for one embodiment of the present invention.

FIG. 4 illustrates conceptually a branching tree that is pruned at times T=1, T=2, T=3, etc., for each slice of information that is taken and propagated on the network. This conceptualizes the use of multiple output buffers as a tree which is continually pruned with the most current pruning corresponding to the present transfer reference image.

Figure 5:
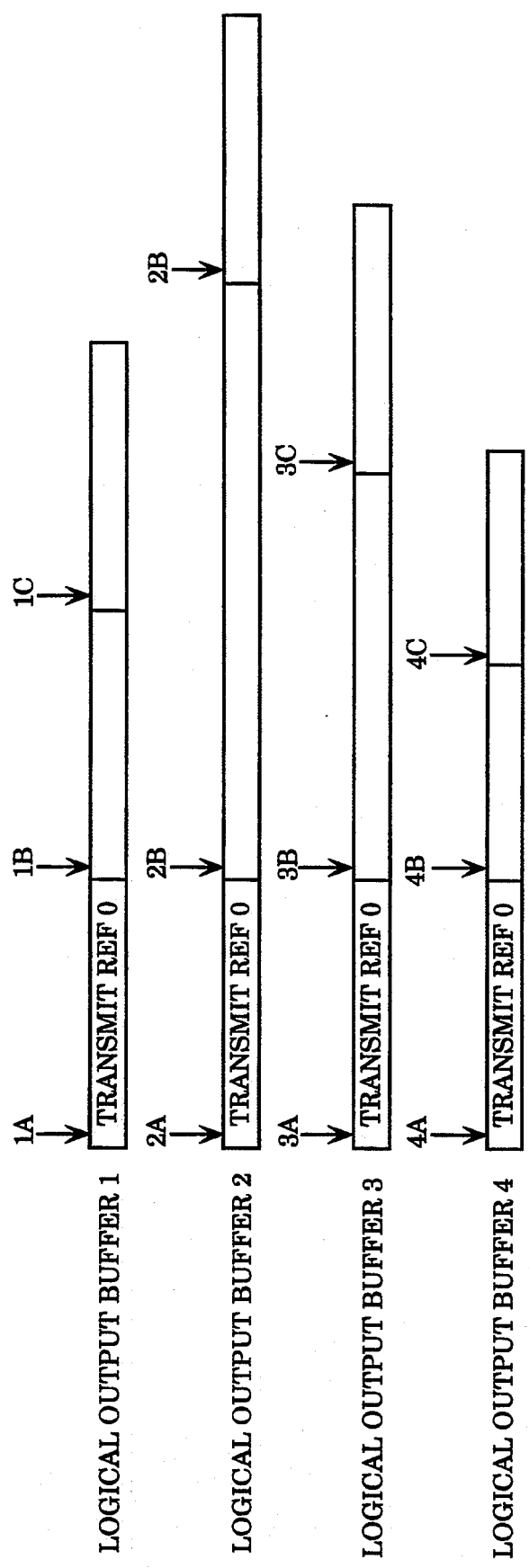
FIG. 5 illustrates alternative logical output buffer uses for channel dependent data transmission over a network.

FIG. 5 illustrates another conceptualization of the present invention. The encoder, through feedback from the data communications channel, creates several logical output buffers corresponding to behavioral predictions based on the feedback from the communications channel. For example, logical output buffer 1 could represent the case where more bandwidth will be dynamically allocated to this natural data compression over the next unit of time. The unit of time could be an image frame or, for example, a frame of sampled audio. In FIG. 5, the various predictions of the bandwidth available to the compression algorithm are shown below in Table I.

TABLE I

| Logical Output Buffer | Prediction of Bandwidth per Unit Time Relative to Current Transmit Reference |
|---|---|
| 1 | about the same |
| 2 | a lot more |
| 3 | more |
| 4 | a lot less |

For video coding, more bandwidth could be used to get sharper images and/or higher frame rate. The actual data contained in the logical output buffers can be significantly different, too. For example, in video coding, the new transmit reference might be calculated from different input images in time and/or spatial resolution. Logical output buffer 1 might represent the data from an image taken 1/15th of a second later than transmit reference 0, while logical output buffer 2 might represent the differential coding from an image half a second later from transmit reference 0. Such an approach would be good for video coding for channels where the bit rate allocated to video may undergo extreme fluctuations such as in the bursty networks described above.

Figure 6:
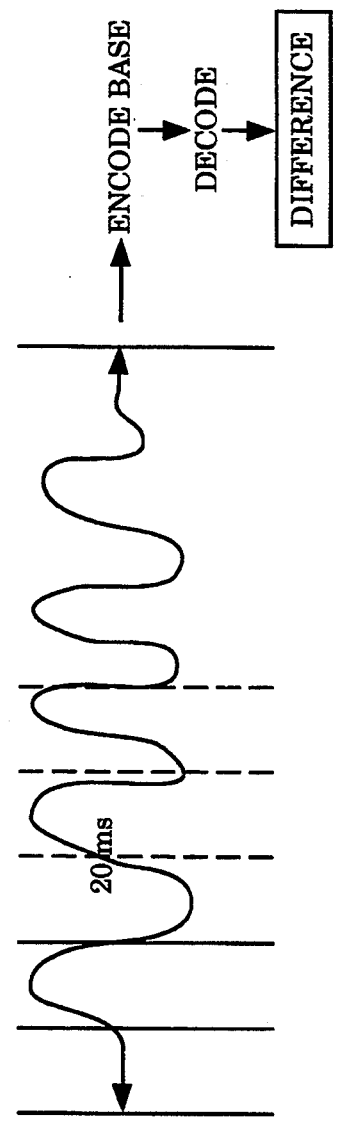
FIG. 6 illustrates characteristics of audio information which may be transmitted over a network in accordance with another embodiment of the present invention.

While with reference to FIGS. 2 and 3, the output buffers are illustrated as, for example, discrete memory elements. FIG. 5 makes it clear that logical buffers may be created in a common block of memory and that the number of such buffers is limited only by the available computational power to simultaneously encode them and the memory to sufficiently handle them. FIG. 6 is used to illustrate that the present invention is not necessarily limited to video encoding and illustrates a frame of audio information. For example, in the G.728 standard each frame of data is 5 milliseconds long. The frame may be stored as a transmit reference and subsequent transmissions may follow the differential coding principals wherein only the changed information is sent to the receiving node. The audio encoder may be responsive to feedback from the network and maintain a plurality of logical output buffers such as those described in the video application. One possible application for such an implementation would be in wireless telephony wherein portions of an audio transmission may be lost when a transmitting station goes through a tunnel. The responding network indicates that its most recently received information is slightly stale and that a late change logical output buffer should be used in providing the encoded differential information.

Figure 7:
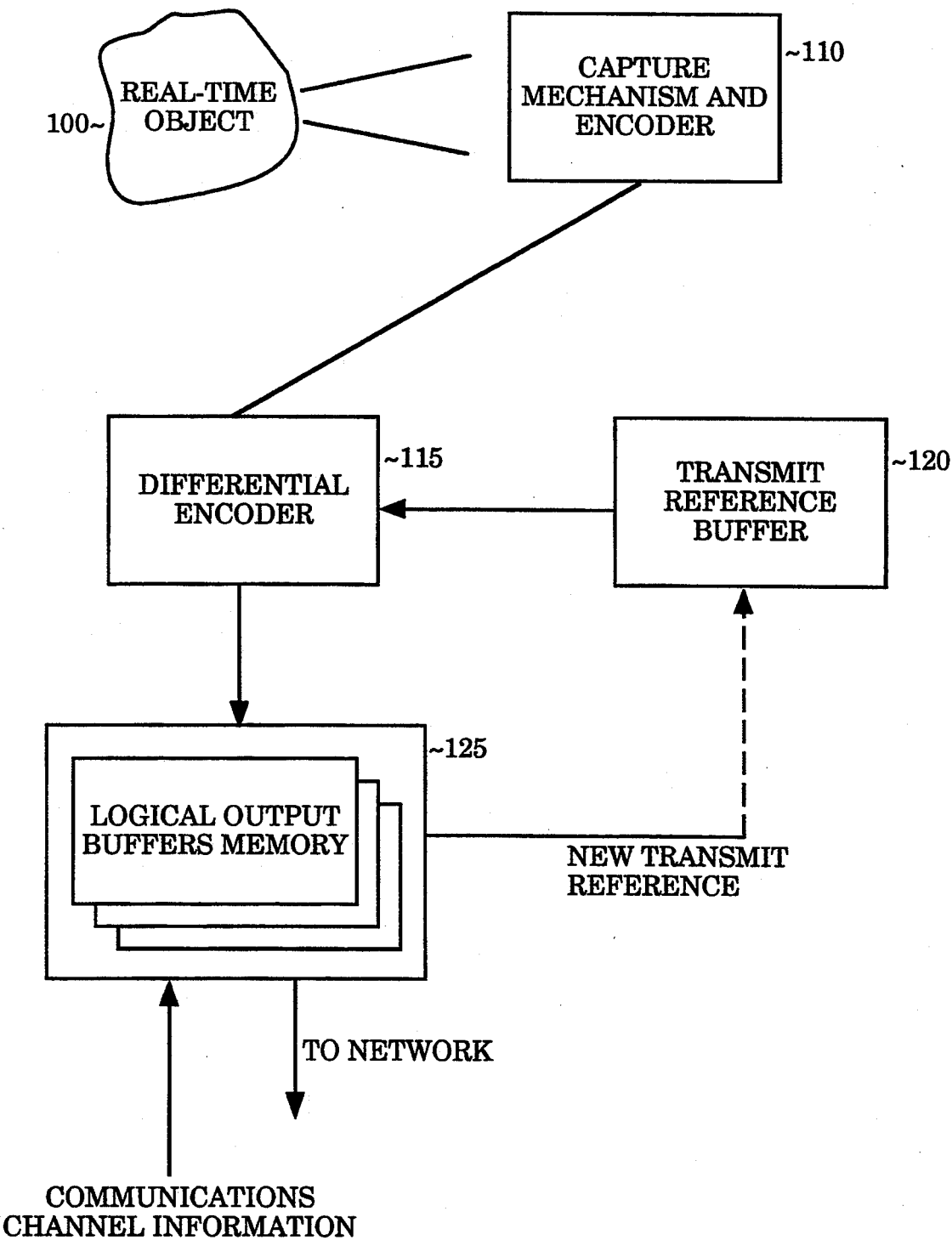
FIG. 7 illustrates a generalized block diagram of the present invention.

In a more general description of the present invention, reference is now made to FIG. 7. Information about a real-time object 100 that is desired to be conveyed from a transmitting node to a receiving node on some sort of network is shown. This real-time object 100 may be a video image or it may be a sound depending on the particular implementation. A capture mechanism 110 detects the real-time object and encodes it into electronic information. The capture mechanism may be a camera for video information as described above or a microphone or stereo microphones for audio information. This information is then processed by differential encoder 115 which compares the newly captured real-time object to the previously stored recorded object in transmit reference buffer 120. The differentially encoded data is then propagated to a logical output buffer 125 which operates as those described above. When the network clears the output buffers for transmission, the particular output buffer having the best information conveys it over the network and that same information is used to calculate a new transmit reference to be stored in transmit reference buffer 120.

There has thus been described a method and apparatus of differential coding for use in bursty transmission networks which greatly improves the quality of transmitted compressed information. Although the present invention has been described in terms of preferred embodiments, it will be appreciated that various modifications and alterations might be made by those skilled in the art without departing from the spirit and scope of the invention. The invention should, therefore, be measured in terms of the claims which follow.

What is claimed is:

1. For use in a communications network having a plurality of nodes wherein a node may encode real-time information for propagating over said network, a method of processing said real-time information comprising the steps of:

providing said node with a plurality of output buffers;

(a) electronically capturing said real-time information and converting it into electronic data;

(b) differentially encoding said electronic data using a previously stored transmit reference image as a base to produce differential data;

(c) storing said differential data in one of said plurality of output buffers;

(d) monitoring said network for access to propagate said differential data;

repeating steps (a)–(d) until said node may propagate said differential data over said network;

transmitting data over said network from the one of said plurality of output buffers providing a best differential data to a receiving node on said network, wherein said best differential data represents a differential data whose use in conjunction with the previously stored transmit reference image produces an image that approximates a current frame better than use of other differential data contained in said plurality of output buffers; and calculating a new transmit reference image based on said best differential data and said previously stored transmit reference image.

* * * * *